(12) United States Patent
Turner et al.

(10) Patent No.: US 10,946,278 B2
(45) Date of Patent: Mar. 16, 2021

(54) GENERATING ALTERNATE REALITY GAMES (ARG) INCORPORATING AUGMENTED REALITY (AR)

(71) Applicants: Sony Corporation, Tokyo (JP); Sony Pictures Entertainment Inc., Culver City, CA (US)

(72) Inventors: Kaigani Turner, Culver City, CA (US); Aaron Goldstein, Culver City, CA (US); Jason Leung, Culver City, CA (US)

(73) Assignees: Sony Corporation, Tokyo (JP); Sony Pictures Entertainment Inc., Culver City, CA (US); Crackle, Inc., Culver City, CA (US)

( * ) Notice: Subject to any disclaimer, the term of this patent is extended or adjusted under 35 U.S.C. 154(b) by 23 days.

(21) Appl. No.: 15/986,708

(22) Filed: May 22, 2018

(65) Prior Publication Data
US 2019/0358543 A1 Nov. 28, 2019

(51) Int. Cl.
| | |
|---|---|
| A63F 13/47 | (2014.01) |
| G06K 9/00 | (2006.01) |
| A63F 13/792 | (2014.01) |
| A63F 13/69 | (2014.01) |
| G07C 13/00 | (2006.01) |

(52) U.S. Cl.
CPC ............. *A63F 13/47* (2014.09); *A63F 13/69* (2014.09); *A63F 13/792* (2014.09); *G06K 9/00671* (2013.01); *A63F 2300/8082* (2013.01); *G07C 13/00* (2013.01)

(58) Field of Classification Search
CPC .................................................. G06Q 30/0209
See application file for complete search history.

(56) References Cited

U.S. PATENT DOCUMENTS

| | | | |
|---|---|---|---|
| 9,552,696 B2 | 1/2017 | Fine et al. | |
| 2013/0044106 A1* | 2/2013 | Shuster | ............... G06T 19/20 345/419 |
| 2014/0080109 A1 | 3/2014 | Haseltine et al. | |
| 2016/0027260 A1 | 1/2016 | Pierce et al. | |
| 2016/0263477 A1 | 9/2016 | Ladd et al. | |
| 2017/0039814 A1* | 2/2017 | Trepp | ............... G07F 17/3293 |

(Continued)

OTHER PUBLICATIONS

"Back to Earth White Paper," by Clay Space, published Apr. 5, 2017. Source https://web.archive.org/web/20181112083539/http://backto.earth/blog/back-to-earth-white-paper/ (Year: 2017).*

(Continued)

*Primary Examiner* — Steven J Hylinski
(74) *Attorney, Agent, or Firm* — Procopio, Cory, Hargreaves & Savitch LLP (57) ABSTRACT

Generating an alternate reality game (ARG) using an augmented reality (AR) application, including: granting crypto-currency tokens to a player when the ARG is started by the player; enabling the player to find clues, discover objects, and interact with characters by presenting, to the player, a surrounding environment layered into a view of the AR application; determining whether the player has reached a decision point of a branching narrative; and enabling the player to send the crypto-currency tokens from the AR application to an intended destination when the decision point is reached.

12 Claims, 7 Drawing Sheets

(56) References Cited

U.S. PATENT DOCUMENTS

| | | | | |
|---|---|---|---|---|
| 2018/0214777 A1* | 8/2018 | Hingorani | ............ | A63F 13/2145 |
| 2018/0365722 A1* | 12/2018 | Jack | .................. | G06Q 30/0209 |
| 2019/0118094 A1* | 4/2019 | McCoy | .................. | A63F 13/73 |
| 2019/0201806 A1* | 7/2019 | Weston | .................. | A63G 31/00 |

OTHER PUBLICATIONS

"Major Back to Earth Updates," by Clay Space, published Sep. 27, 2017. Source https://medium.com/@clayspace/major-back-to-earth-updates-af815d3a7074 (Year: 2017).*

"Dexter The Game for iPhone Available Now," by Matt Peckham for PCWorld, Published Se. 14, 2009. (Year: 2009).*

"Dexter Slice of Life: A Facebook Game for Your Inner Serial Killer," by Jennifer Van Grove, Published for Mashable.com on Jul. 22, 2011 (Year: 2011).*

Back to Earth: 'Alternate Reality' game using cryptocurrency [invite code inside!]; Dean; Apr. 26, 2017; 7 pages.

\* cited by examiner

GENERATING ALTERNATE REALITY GAMES (ARG) INCORPORATING AUGMENTED REALITY (AR)

BACKGROUND

Field

The present disclosure relates to forms of gameplay, and more specifically, to generating alternate reality games which incorporate augmented reality.

Background

A television series may face the problem of decreased audience engagement during the off-season. Therefore, a need exists to provide content to the audiences to keep them involved until the following season launches and potentially increase viewing figures by attracting new audiences.

SUMMARY

The present disclosure provides for generating alternative reality games (ARGs) including a branching narrative and set in a parallel, fictional world of augmented reality (AR).

In one implementation, a method for generating an alternate reality game (ARG) using an augmented reality (AR) application is disclosed. The method includes: granting crypto-currency tokens to a player when the ARG is started by the player; enabling the player to find clues, discover objects, and interact with characters by presenting, to the player, a surrounding environment layered into a view of the AR application; determining whether the player has reached a decision point of a branching narrative; and enabling the player to send the crypto-currency tokens from the AR application to an intended destination when the decision point is reached.

In one implementation, the decision point includes a point where voting on an event of the ARG needs to be made. In one implementation, the intended destination is a fictional character within the ARG. In one implementation, the crypto-currency tokens are built on a blockchain. In one implementation, enabling the player to find clues, discover objects, and interact with characters includes: presenting alternate-reality events of the ARG within the AR application; and recording the alternate-reality events on the blockchain. In one implementation, enabling the player to find clues, discover objects, and interact with characters includes: presenting alternate-reality events of the ARG outside of the AR application; and recording the alternate-reality events on the blockchain. In one implementation, presenting alternate-reality events outside of the AR application includes interacting with fictional characters on social media. In one implementation, the interactions with the fictional characters on the social media are linked back into the alternate-reality events within the ARG. In one implementation, the alternate-reality events of the ARG take place between two seasons of a television series. In one implementation, the ARG includes interactive narratives through which the player is lead. In one implementation, the interactive narratives include the use of at least one of mobile applications, websites, social media pages, phone numbers, and physical locations.

In another implementation, an augmented reality (AR) application used to generate an alternate reality game (ARG) is disclosed. The AR application includes: crypto-currency tokens to be granted to a player when the ARG is started by the player; an environment presenter to present a surrounding environment layered into a view of the AR application to enable the player to find clues, discover objects, and interact with characters; and a branching narrative generator to generate a decision point in the ARG, wherein the player sends the crypto-currency tokens from the AR application to an intended destination when the decision point has been reached.

In one implementation, the decision point includes a point where voting on an event of the ARG needs to be made. In one implementation, the intended destination is a fictional character within the ARG. In one implementation, the crypto-currency tokens are built on a blockchain. In one implementation, the environment presenter further includes: an events presenter to present alternate-reality events of the ARG within the AR application; and a recorder to record the alternate-reality events on the blockchain. In one implementation, the environment presenter further includes: an events presenter to present alternate-reality events of the ARG outside of the AR application; and a recorder to record the alternate-reality events on the blockchain. In one implementation, the events presenter enables interactions with fictional characters on social media which are linked back into the alternate-reality events within the ARG. In one implementation, the ARG includes interactive narratives through which the player is lead. In one implementation, the interactive narratives include the use of at least one of mobile applications, websites, social media pages, phone numbers, and physical locations.

In yet another implementation, a non-transitory computer-readable storage medium storing a computer program to generate an alternate reality game (ARG) using an augmented reality (AR) application is disclosed. The computer program includes executable instructions that cause a computer to: grant crypto-currency tokens to a player when the ARG is started by the player; enable the player to find clues, discover objects, and interact with characters by presenting, to the player, a surrounding environment layered into a view of the AR application; determine whether the player has reached a decision point of a branching narrative; and enable the player to send the crypto-currency tokens from the AR application to an intended destination when the decision point is reached.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, content related to a television series may need to be provided to the audiences during the off-season to keep them involved until the following season.

Certain implementations of the present disclosure provide for generating alternative reality games (ARGs) including a branching narrative and set in a parallel, fictional world of augmented reality (AR). The ARGs are fueled by audience participation through the use of crypto-currency tokens. The game leads the players through an interactive transmedia narrative that includes mobile applications, websites, social media pages, phone numbers, and physical locations. Further, the existing technologies linked together to enable the creation of new transmedia narrative experiences without technology overhead.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, an AR device is used as one of the storytelling devices, which is capable of displaying a real-time view of a physical, real-world environment or elements of a physical, real-world environment, while altering elements within the displayed view of the environment. Thus, the AR device displays a view of the real world but augments elements using computer graphics technology.

In one implementation, the ARG of the present disclosure uses a branching narrative scripted as a piece of interactive fiction which is experienced through an augmented reality (AR) mobile application or virtual reality (VR) headset. That is, the branching narrative uses the real world as a platform and employs storytelling across many different media to deliver a story that may be altered by the actions of the players. In one particular implementation, the fictional events of the crypto-currency experience takes place between two seasons of a television series.

In one implementation, events of an alternative-reality game (ARG) unfold in real-time and the players experience these events through the use of the augmented reality (AR) application. The player interactions with individual characters and/or events within the ARG are mediated by the use of crypto-currency tokens. The tokens are an actual crypto-currency, but only hold value within the fictional world of the ARG. The crypto-currency tokens are built on a blockchain platform, which allows other events on social media to be linked back into the events of the ARG without additional technology overhead. Thus, the rules of the ARG are set up in the blockchain, which is used to manage the branching narrative. That is, the blockchain manages and records events and actions within the ARG using a 'ledger of truth'.

The choices made by the players effectively weight the decisions of the branching narrative. For example, by either affecting the player's individual storyline or the cumulative storyline of all players participating in the ARG. In some embodiments, a game manager manages a storyline underlying the ARG. In other embodiments, the game manager supports messaging between players. In further embodiments, the game manager render scenes, views, perspectives, and other attributes of the ARG on a user interface of the AR application.

Figure 1:
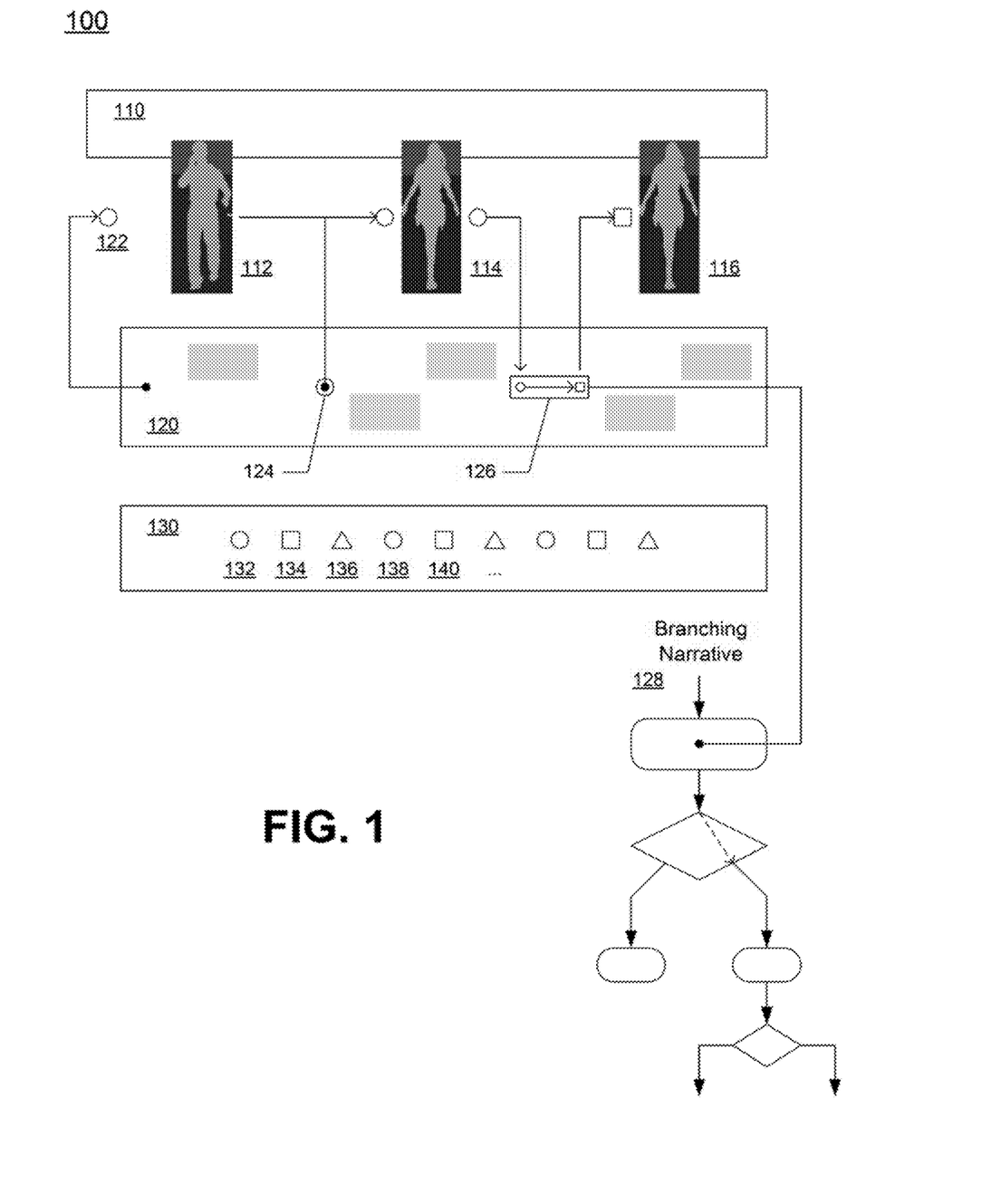
FIG. 1 is an overview diagram of the alternate reality game (ARG) in accordance with one implementation of the present disclosure.

FIG. 1 is an overview diagram 100 of the ARG in accordance with one implementation of the present disclosure. In the illustrated implementation of FIG. 1, the players 112, 114, 116 experience the ARG through the use of an AR application 110. As stated above, the interactions of the players 112, 114, 116 with characters and/or events within the ARG are mediated by the use of crypto-currency tokens, which are built on a blockchain platform. Further, the ARG leads the players 112, 114, 116 through the interactive narrative that includes connections and objects 130 such as mobile applications 132, websites 134, social media pages 136, phone numbers 138, physical locations 140, and others.

In one implementation, the blockchain manages and records events and actions within the ARG using a ledger 120. In the illustrated implementation of FIG. 1, the ledger 120 records various transactions including a token generation 122, transaction 124 between player 112 and player 114, and transaction 126 in which crypto-currency tokens are exchanged for virtual AR object. In one example, the crypto-currency tokens are exchanged for limited edition digital collectibles including a proof of authenticity and a digital signature embedded in the blockchain. Thus, in FIG. 1, the choices made by the players (in transaction 126) weight the decisions of the branching narrative 128.

The blockchain data structure is an ordered list of blocks. Each block points back to its predecessor until the first block, which is sometimes referred to as the genesis block. The blocks and their sequencing are protected in integrity by backward-linking of cryptographic hashes. There are many blockchains and usage of blockchains, but the most famous ones are Bitcoin and Ethereum.

Figure 2:
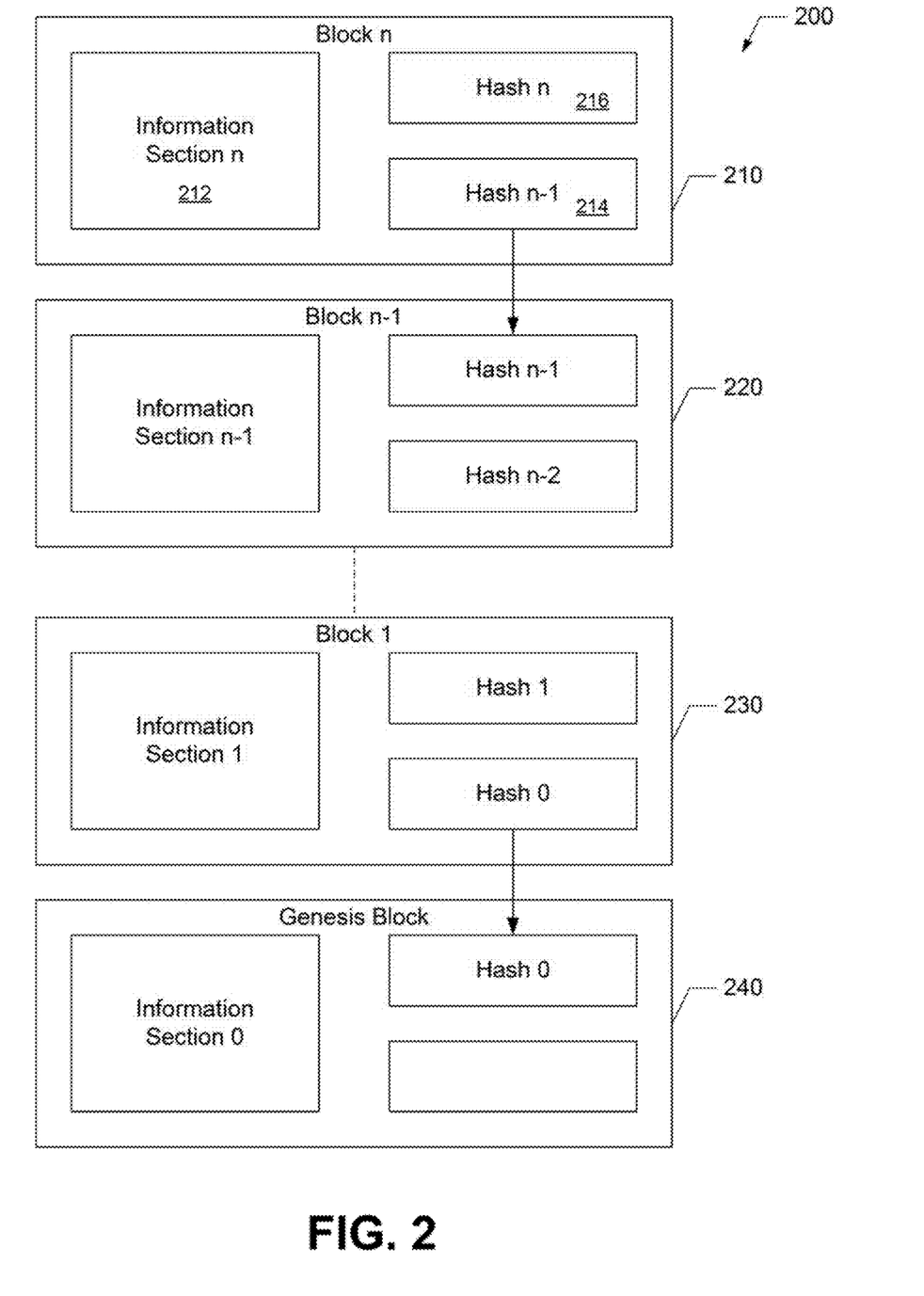
FIG. 2 is a block diagram of a blockchain including n blocks and a genesis block.

FIG. 2 is a block diagram of a blockchain 200 including n blocks 210, 220, 230 and a genesis block 240. In one implementation, a block has at least three elements: (a) an information section (e.g., 212) that stores the registered data and ancillary data, wherein the information section may be signed to prove its authenticity; (b) the cryptographic hash (e.g., 214) of the previous block (the genesis block will not have a previous block); and (c) the cryptographic hash (e.g., 216) of the current block. Thus, the data structure of the blockchain provides an append-only global log, which is tamper evident.

Figure 3A:
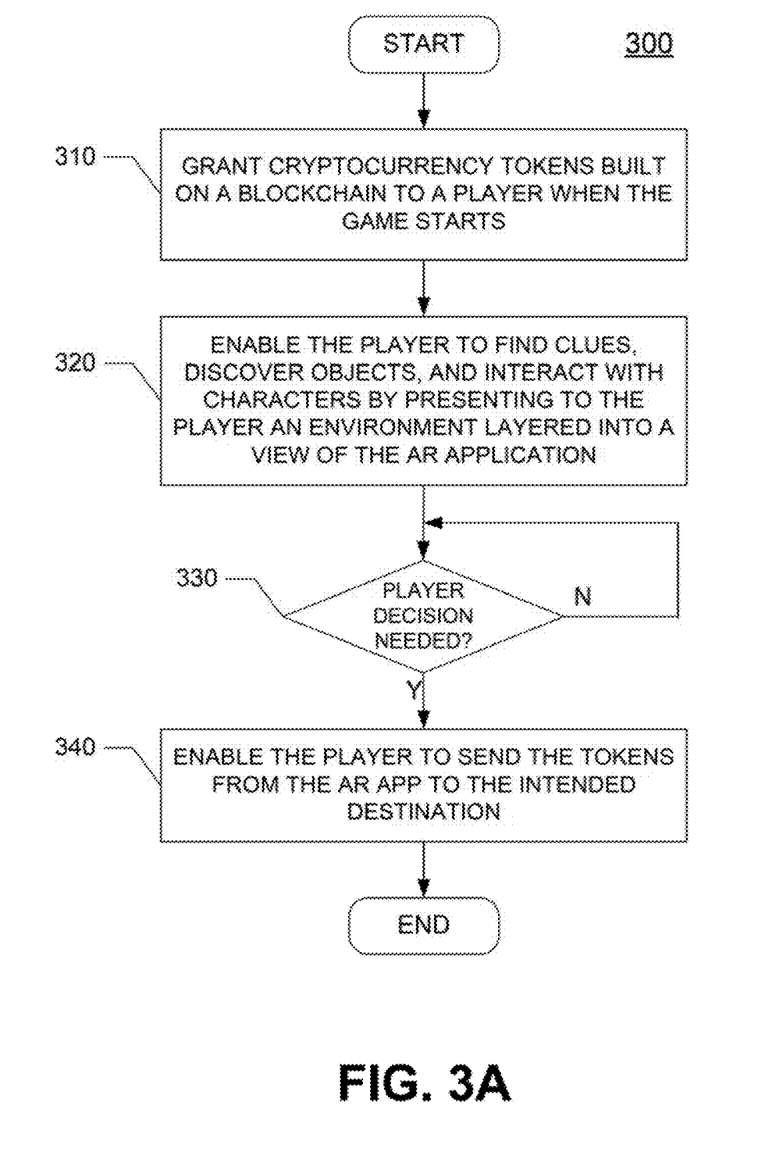
FIG. 3A is a functional flow diagram illustrating a gameplay flow of the ARG in accordance with one implementation of the present disclosure.

FIG. 3A is a functional flow diagram 300 illustrating a gameplay flow of the ARG in accordance with one implementation of the present disclosure. In the illustrated implementation of FIG. 3A, the crypto-currency tokens are granted, at step 310, to a player when the game (i.e., the ARG) is started by the player. In one implementation, the crypto-currency tokens are built on a blockchain.

At step 320, enable the player to find clues, discover objects, and interact with characters by presenting, to the player, a surrounding environment layered into a view of the AR application. A determination is made, at step 330, whether the player has reached a point where a decision should be made (a decision point) such as voting on an event which has occurred in the game. If it is determined, at step 330, that the player has reached the decision point, the player is enabled, at step 340, to send the tokens from the application (i.e., the AR app) to the intended destination. In one example, the intended destination is a fictional character (e.g., a politician) who is asking for a campaign contribution.

Thus, in one implementation, the gameplay involves the player's judgement in how to allocate the limited amount of crypto-currency tokens granted to the player to achieve the intended effect on the storyline and/or to create opportunities to accumulate additional tokens (e.g. the politician rewards the player with a valuable contract). In some implementations, the cumulative decisions of all of the players in the game can also have an effect on the overarching storyline. For example, as a result of the campaign contribution, Politician A wins the election over Politician B. In other implementations, at the end of the gameplay event, the players can use their total collected tokens to register for a prize competition to reward the most successful players. Because the crypto-currency token has been built on a blockchain, additional alternate-reality events can happen outside of the app (e.g. interacting with a fictional reporter on Twitter), recorded on the blockchain, and then have an effect back within the game.

Figure 3B:
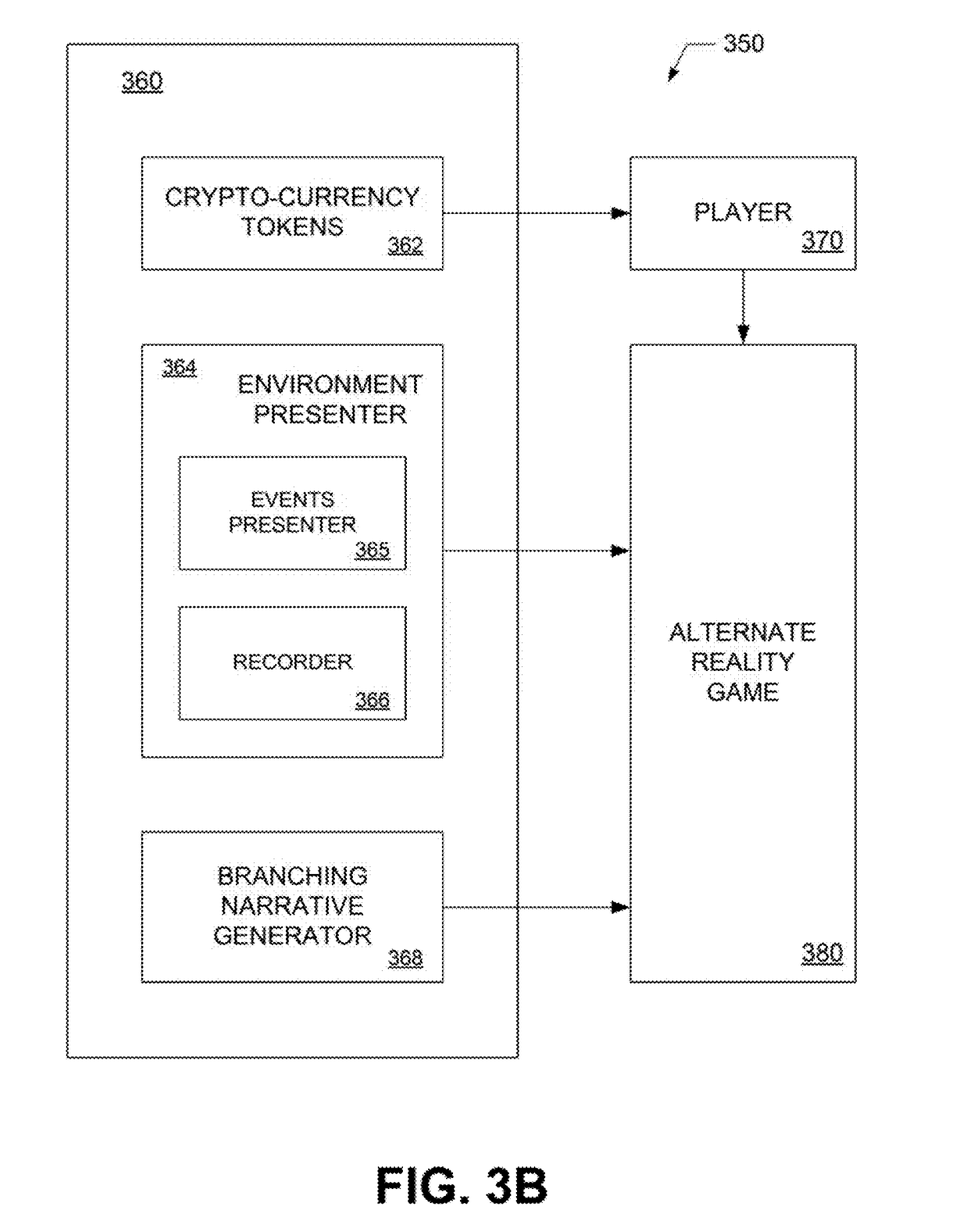
FIG. 3B is a functional block diagram of an AR application used to generate an ARG in accordance with one implementation of the present disclosure.

FIG. 3B is a functional block diagram 350 of an augmented reality (AR) application 360 used to generate an alternate reality game (ARG) 380 in accordance with one implementation of the present disclosure. In the illustrated implementation of FIG. 3B, the AR application 360 includes crypto-currency tokens 362, an environment presenter 364, and a branching narrative generator 368. The crypto-currency tokens 362 are to be granted to a player 370 when the ARG 380 is started by the player 370. The environment presenter 364 presents a surrounding environment layered into a view of the AR application 360 to enable the player 370 to find clues, discover objects, and interact with characters. The branching narrative generator 368 generates a decision point in the ARG 380, wherein the player 370 sends the crypto-currency tokens 362 from the AR application 360 to an intended destination when the decision point has been reached.

In one implementation, the decision point includes a point where voting on an event of the ARG 380 needs to be made. In one implementation, the intended destination is a fictional character within the ARG 380. In one implementation, the crypto-currency tokens 362 are built on a blockchain. In one implementation, the environment presenter 364 further includes: an events presenter to present alternate-reality events of the ARG 380 within the AR application 360; and a recorder to record the alternate-reality events on the blockchain. In one implementation, the environment presenter 364 further includes: an events presenter 365 to present alternate-reality events of the ARG 380 outside of the AR application 360; and a recorder 366 to record the alternate-reality events on the blockchain. In one implementation, the events presenter 365 enables interactions with fictional characters on social media which are linked back into the alternate-reality events within the ARG 380. In one implementation, the ARG 380 includes interactive narratives through which the player 370 is lead. In one implementation, the interactive narratives include the use of at least one of mobile applications, websites, social media pages, phone numbers, and physical locations.

Figure 4:
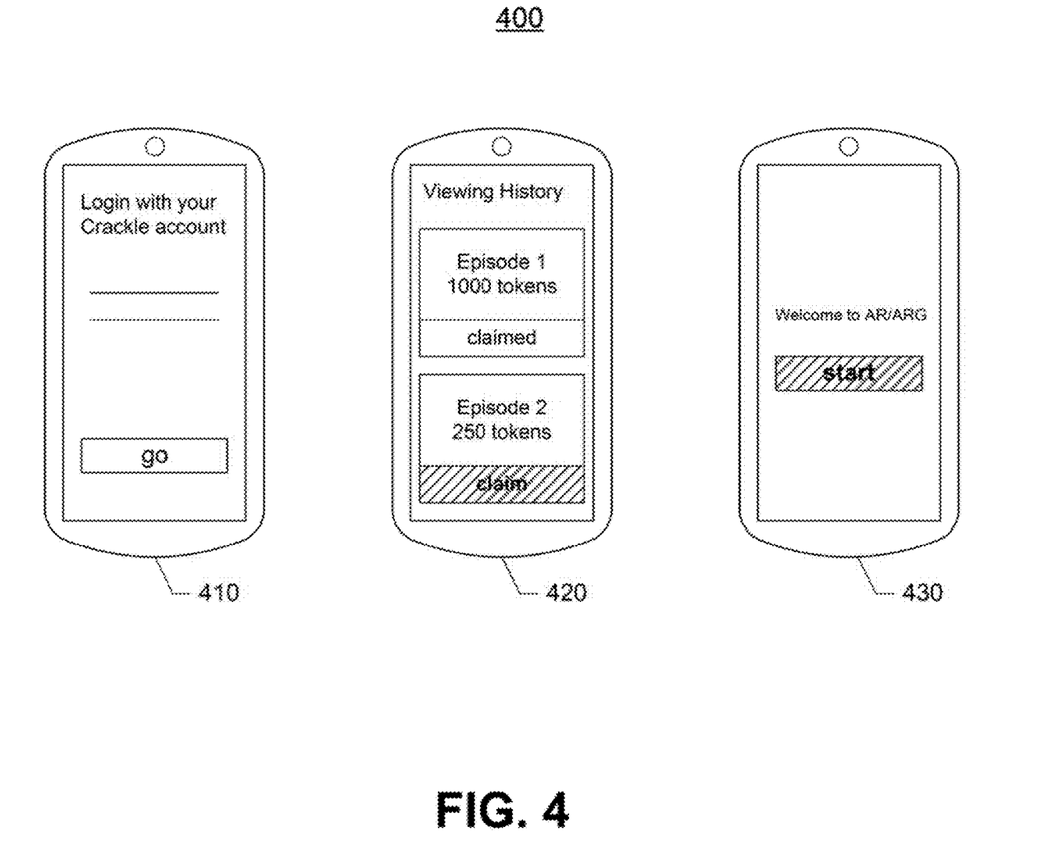
FIG. 4 is a first use case example of the gameplay in accordance with one implementation of the present disclosure.

FIG. 4 is a first use case example 400 of the gameplay in accordance with one implementation of the present disclosure. In the illustrated implementation of FIG. 4, player A opens the AR application and logs into a video entertainment network, such as Crackle, with account details of player A (see view 410). Player A reviews the viewing history for the related television series. With each episode, there is a number of tokens to be claimed as a reward for having watched that episode (see view 420). Player A is now ready to begin the story mode and participate in events as they unfold in the mobile application's AR view (see view 430).

Figure 5A:
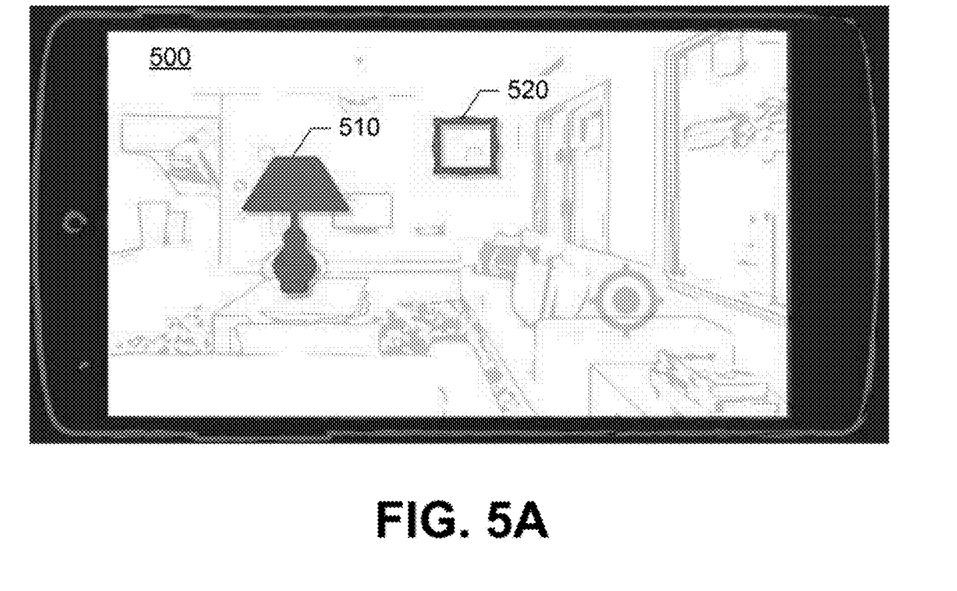
FIG. 5A is a first AR view of a second use case example of the gameplay in accordance with one implementation of the present disclosure.
Figure 5B:
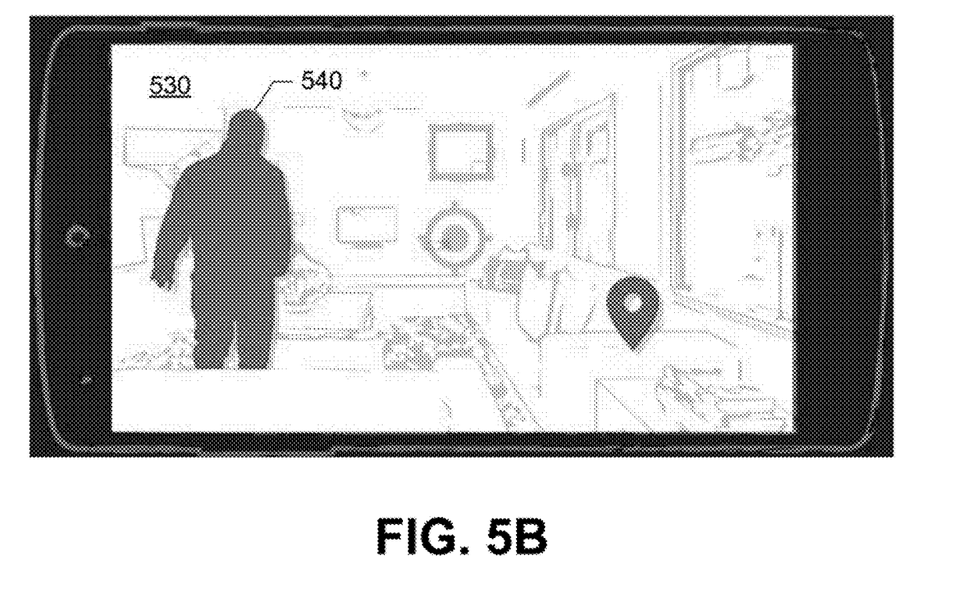
FIG. 5B is a second AR view of the second use case example of the gameplay in accordance with one implementation of the present disclosure.

FIGS. 5A and 5B show a second use case example of the gameplay in accordance with one implementation of the present disclosure.

FIG. 5A is a first AR view 500 in which player A looks around a room at the virtual assets (e.g., assets 510, 520) collected and placed as keepsakes by player A. The assets are all limited edition objects which player A can trade as digital assets on the blockchain. As player A looks around the room, player A hears a doorbell and taps on the interactive prompt.

FIG. 5B is a second AR view 530 in which player A answers the doorbell and a character 540 walks in and presents a new twist in the storyline. Player A has now reached a decision point of a branching narrative (which is illustrated in FIG. 6).

Figure 6:
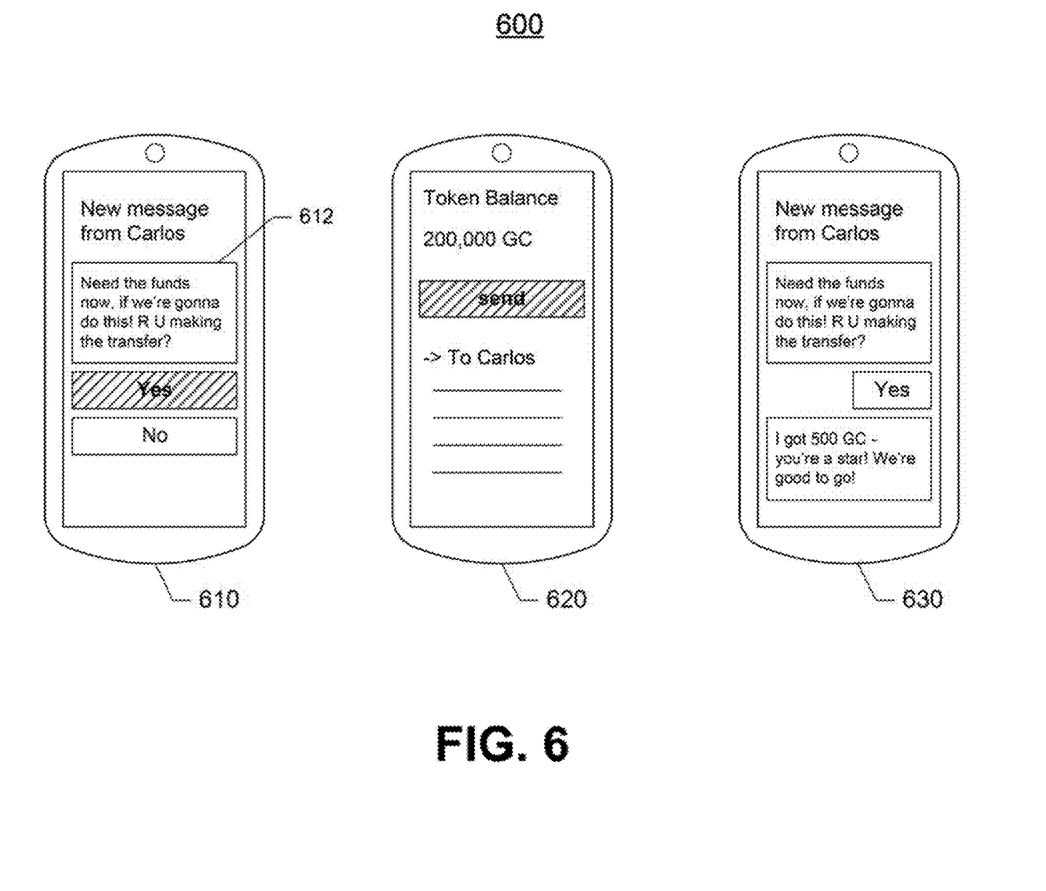
FIG. 6 is a third use case example 600 of the gameplay in accordance with one implementation of the present disclosure.

FIG. 6 is a third use case example 600 of the gameplay in accordance with one implementation of the present disclosure. In view 610 of FIG. 6, following on from the AR narrative event, player A continues to interact with the characters and storyline through a messenger 612. The decision point prompts player A to send some of the tokens allocated/granted to player A to a character in the game.

In view 620 of FIG. 6, player A reviews the token balance and decides how much to send to the character. Depending on how much or how little player A sends to the character, there may be different narrative outcomes.

In view 630 of FIG. 6, player A makes a choice and the character responds in real-time from when the transaction is processed and the virtual funds have been received. In one implementation, sharing access to the same blockchain, other interactions (e.g., on social media) outside of the AR application can also prompt story events within the application.

The descriptions herein of the disclosed implementations are provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, although the implementations of the specification describe that the content/game is related to a television series and is provided to the audiences during the off-season to keep them involved until the following season, in other implementations, the content/game may not be related to a television series but may be a standalone content/game. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for generating an alternate reality game (ARG) using an augmented reality (AR) application on an AR device, the method comprising:
    granting crypto-currency tokens to a player when the ARG is started by the player,
    wherein the ARG includes a branching narrative used to deliver a story of a television series that is altered by actions of the player and is set in a parallel, fictional world of the AR application being displayed on the AR device, and the ARG provides contents to audiences of the television series during an off-season of the television series to keep the audiences involved during the off-season,
    wherein the AR device displays a view of a real world but augments elements of the fictional world,
    wherein the off-season includes a period of time between an end of one season and a start of a next season of the television series;
    enabling the player to find clues, discover objects, and interact with characters by presenting, to the player, a surrounding environment layered into a view of the AR application on the AR device,
    wherein said interact with characters includes enabling the player to interact with the characters through social media sites;
    determining whether the player has reached a decision point of the branching narrative; and
    enabling the player to send the crypto-currency tokens from the AR application to a destination within the ARG to affect an event of the ARG when the decision point is reached.

2. The method of claim 1, wherein the decision point includes a point where voting on the event of the ARG needs to be made.

3. The method of claim 1, wherein the decision point of the branching narrative is weighted by one of affecting an individual storyline of the player or a cumulative storyline of all players participating in the ARG.

4. The method of claim 1, wherein the crypto-currency tokens are built on a blockchain.

5. The method of claim 4, wherein enabling the player to find clues, discover objects, and interact with characters comprises:
    presenting alternate-reality events of the ARG within the AR application; and
    recording the alternate-reality events on the blockchain.

6. The method of claim 4, wherein enabling the player to find clues, discover objects, and interact with characters comprises:
    presenting alternate-reality events of the ARG outside of the AR application; and
    recording the alternate-reality events on the blockchain.

7. The method of claim 6, wherein presenting alternate-reality events outside of the AR application comprises interacting with fictional characters on social media.

8. The method of claim 7, wherein the interactions with the fictional characters on the social media are linked back into the alternate-reality events within the ARG.

9. The method of claim 8, wherein the alternate-reality events of the ARG take place during the off-season of a television series.

10. The method of claim 1, wherein the ARG includes interactive narratives through which the player is led.

11. The method of claim 10, wherein the interactive narratives include the use of at least one of mobile applications, websites, social media pages, phone numbers, and physical locations.

12. A non-transitory computer-readable storage medium storing a computer program to generate an alternate reality game (ARG) using an augmented reality (AR) application, the computer program comprising executable instructions that cause a computer to:
    grant crypto-currency tokens to a player when the ARG is started by the player,
    wherein the ARG includes a branching narrative used to deliver a story of a television series that is altered by actions of the player and is set in a parallel, fictional world of the AR application being displayed on the AR device, and the ARG provides contents to audiences of the television series during an off-season of the television series to keep the audiences involved during the off-season,
    wherein the AR device displays a view of a real world but augments elements of the fictional world,
    wherein the off-season includes a period of time between an end of one season and a start of a next season of the television series;
    enable the player to find clues, discover objects, and interact with characters by presenting, to the player, a surrounding environment layered into a view of the AR application on the AR device,
    wherein said interact with characters includes enabling the player to interact with the characters through social media sites;

determine whether the player has reached a decision point of the branching narrative; and enable the player to send the crypto-currency tokens from the AR application to a destination within the ARG to affect an event of the ARG when the decision point is reached.

\* \* \* \* \*